(12) United States Patent  
Chen et al.

(10) Patent No.: US 8,666,210 B2  
(45) Date of Patent: Mar. 4, 2014

(54) LIQUID CRYSTAL DISPLAYS AND PANELS

(75) Inventors: Chien-Hong Chen, Miaoli County (TW); Jian-Cheng Chen, Miaoli County (TW); Rung-Nan Lu, Miaoli County (TW)

(73) Assignee: Chimei Innolux Corporation, Miaoli County (TW)

( * ) Notice: Subject to any disclaimer, the term of this patent is extended or adjusted under 35 U.S.C. 154(b) by 742 days.

(21) Appl. No.: 12/758,989

(22) Filed: Apr. 13, 2010

(65) Prior Publication Data

US 2010/0265422 A1 Oct. 21, 2010

(30) Foreign Application Priority Data

Apr. 17, 2009 (TW) .................... 98112869 A

(51) Int. Cl.  
*G02F 1/133* (2006.01)  
*G02F 1/1343* (2006.01)  
*G02F 1/136* (2006.01)

(52) U.S. Cl.  
USPC .................. 385/38; 385/33; 385/42; 385/141

(58) Field of Classification Search  
USPC ........................................ 349/33, 38, 42, 141  
See application file for complete search history.

(56) References Cited

U.S. PATENT DOCUMENTS

| 5,923,394 A * | 7/1999 | Miyazaki et al. ............. 349/172 |
| 7,474,292 B2 | 1/2009 | Kamada et al. |
| 7,586,573 B2 | 9/2009 | Yoshida et al. |
| 2003/0193625 A1 * | 10/2003 | Yoshida et al. ............. 349/43 |
| 2009/0002588 A1 | 1/2009 | Lee et al. |
| 2009/0096945 A1 * | 4/2009 | Su et al. ............. 349/38 |

FOREIGN PATENT DOCUMENTS

| CN | 1677179 A | 10/2005 |
| CN | 1737673 A | 2/2006 |
| TW | 200620675 | 6/2006 |

OTHER PUBLICATIONS

Taiwanese language office action dated Aug. 30, 2012.  
English language translation of abstract of TW 200620675 (published Jun. 16, 2006).  
CN Office Action dated Nov. 13, 2013.

* cited by examiner

*Primary Examiner* — Mark Robinson  
*Assistant Examiner* — Jerry Blevins  
(74) *Attorney, Agent, or Firm* — McClure, Qualey & Rodack, LLP

(57) ABSTRACT

A liquid crystal (LC) display panel including a lower substrate with pixel structures, an upper substrate, and an LC layer is provided. Each of the pixel structures includes a transistor and a pixel electrode. The pixel electrode includes first and second pixel electrodes insulated from each other, respectively including a first pattern and a second pattern that different and complementary to each other. Each of the first pixel electrode and the second pixel electrode has at least a trunk with a width smaller than or equal to 10 microns and a plurality of branches. The LC layer is positioned between the upper and the lower substrates and includes a plurality of LC molecules and a plurality of polymers, which are formed on surfaces of at least one of the upper and the lower substrates to cause the plurality of LC molecules to have a pretilt angle.

18 Claims, 3 Drawing Sheets

LIQUID CRYSTAL DISPLAYS AND PANELS

This application claims the benefit of Taiwan application Serial No. 098112869, filed Apr. 17, 2009, the subject matter of which is incorporated herein by reference.

BACKGROUND

1. Field

The present disclosure is related to a liquid crystal display (LCD) panels and LCD devices, and more particularly to LCD panels and LCD devices incorporating wide viewing-angle and low color shift techniques.

2. Description of the Related Art

The liquid crystal display industry is currently flourishing. As manufacturing processes and picture quality has improved along with increases in demand for liquid crystal displays, manufacturers have responded by improving the display quality while expanding production capacity. The view-angle is one aspect of picture quality. Multi-domain vertical alignment (MVA) is an example of a wide viewing-angle technique. A polymer-sustained MVA (PSMVA) technique is included in the MVA technique field. The PSMVA technique dopes monomers into liquid crystal (LC) molecules and injects the LC molecules into a panel module. Then an operation voltage is applied to the panel module to cause the LC molecules queue up in order and an ultra-violet (UV) ray is applied to the panel module to cause the monomers polymerize into polymers, which makes the LC molecules have a pretilt angle to achieve a high response of the LC molecules. Additionally, only the transparent pixel electrodes on one substrate are used for forming domains structures, which may include MVA structures, such as protrusions with polymer material or pixel electrode slits, and the process for patterning transparent electrode on the other substrate can be saved with MVA structures.

SUMMARY

The disclosure describes a liquid crystal display (LCD) panel applying polymer sustained multi-domain vertical alignment (PSMVA) technique and having the manufacture process advantages that patterning MVA structures of transparent electrodes disposed on the other substrate can be saved. Additionally, the pixel electrodes within each pixels of the LCD panel includes at least two electrodes for providing two brightness areas in one pixel, so as to achieve color shift adjustment and enhance the picture quality of the LCD panel.

According to first aspect of the present disclosure, an LCD panel is provided. The LCD panel includes a lower substrate with a plurality of pixel structures, an upper substrate, and an LC layer. Each of the plurality pixel structures includes a transistor and a pixel electrode. The pixel electrode includes first and second pixel electrodes insulated from each other. The first pixel electrode has a first pattern, and the second pixel electrode has a second pattern. The first pattern and the second pattern, correspond to each of the pixel structures, are different and complementary to each other. Each of the first pixel electrode and the second pixel electrode has at least a trunk and a plurality of branches. The branches is connected to the trunk, and the trunk has a width smaller than or equal to 10 microns ($\mu$m). The upper substrate is positioned in parallel and on top of the lower substrate. The LC layer is positioned between the upper and the lower substrates and includes a plurality of LC molecules and a plurality of polymers. The polymers are formed on surfaces of at least one of the upper and the lower substrates to cause the plurality of LC molecules have a pretilt angle.

According to second aspect of the present disclosure, an LCD is provided. The LCD includes an LCD panel and a backlight module. The LCD panel includes a lower substrate with a plurality of pixel structures, an upper substrate, and an LC layer. Each of the plurality pixel structures includes a transistor and a pixel electrode. The pixel electrode includes first and second pixel electrodes insulated from each other and respectively including a first pattern and a second pattern, which are different and complementary to each other and correspond to each of the pixel structures. Each of the first pixel electrode and the second pixel electrode has at least a trunk and a plurality of branches. The branches is connected to the trunk, and the trunk has a width smaller than or equal to 10 microns ($\mu$m). The upper substrate is positioned in parallel and on top of the lower substrate. The LC layer is positioned between the upper and the lower substrates and includes a plurality of LC molecules and a plurality of polymers. The polymers are formed on surfaces of at least one of the upper and the lower substrates to cause the plurality of LC molecules have a pretilt angle. The backlight module provides backlight to the LCD panel, so as to achieve image display.

Various embodiments will become apparent from the following detailed description. The description is made with reference to the accompanying drawings.

DETAILED DESCRIPTION

Figure 1:
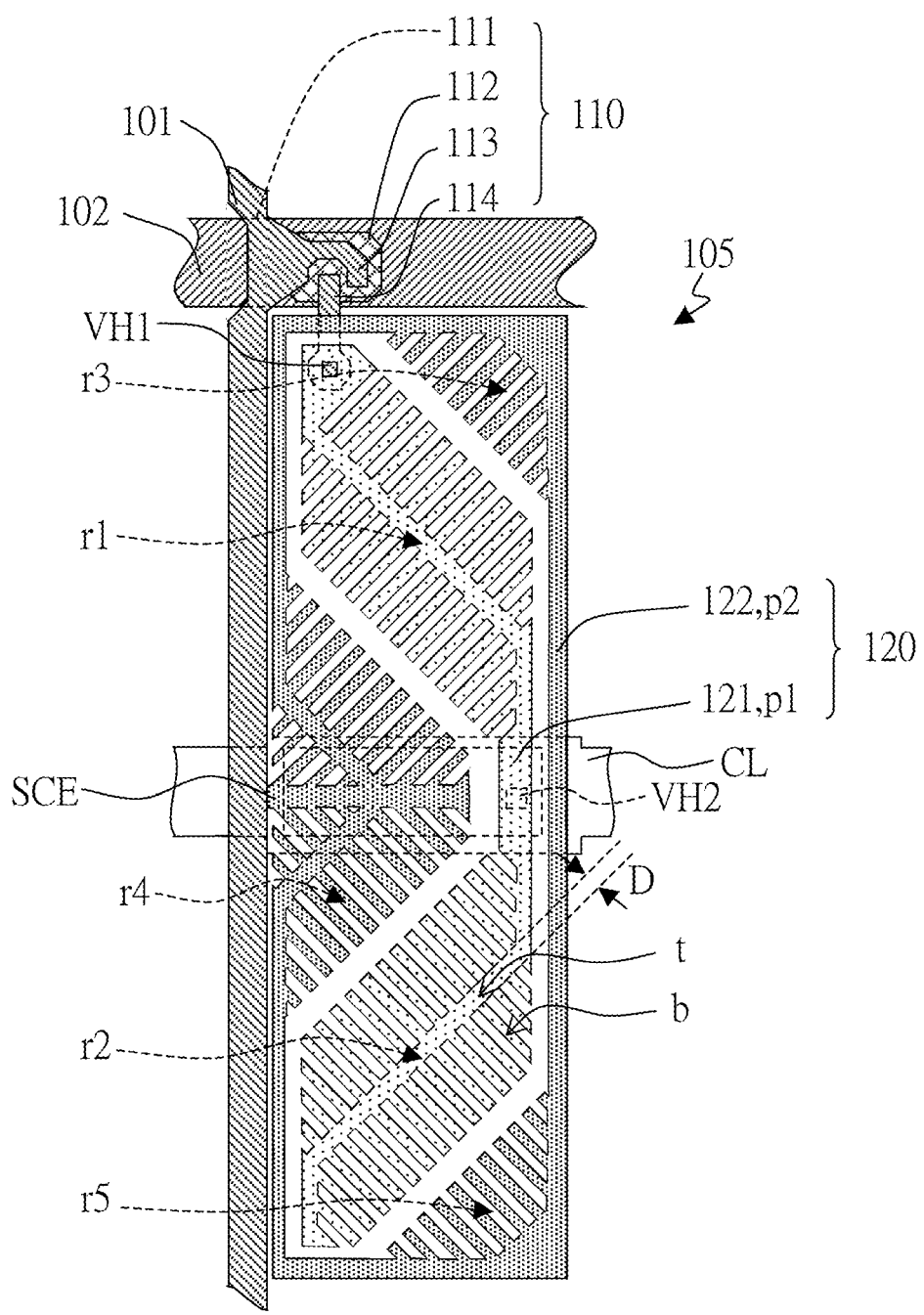
FIG. 1 is an illustration of a nonlimiting embodiment of the pixel structure of a liquid crystal display panel.

The present disclosure provides a liquid crystal display (LCD) panel including a lower substrate, an upper substrate, and a liquid crystal (LC) layer. The upper substrate is positioned in parallel with and on top of the lower substrate. The LC layer is positioned between the upper substrate and the lower substrate. The lower substrate includes a number of pixel structures, each of which includes a transistor and a pixel electrode. The pixel electrode includes a first pixel electrode and a second pixel electrode, which are insulated from each other.

In an example, the first pixel electrode is electrically connected with the drain of the transistor for receiving a first data voltage, which is further coupled to the second pixel electrode, so that the second pixel electrode is correspondingly induced with a second data voltage. The first and the second pixel electrodes respectively include a first pattern and a second pattern, which are substantially different and complementary to each other and correspond to each of the pixel structures. Each of the first pixel electrode and the second pixel electrode has at least a trunk and a number of branches. The branches are connected to the trunk, and the trunk has a width smaller than or equal to 10 microns ($\mu$m). The LC layer is positioned between the upper and the lower substrates. The LC layer includes a plurality of LC molecules and polymers. The polymers are positioned on surfaces of at least one of the upper and lower substrates to make the LC molecules have a pretilt angle.

In an embodiment of the present disclosure, the first pixel electrode is electrically connected to a metal wire to obtain the first data voltage. Thus, while the LCD panel carries out the operations of displaying an image, the area corresponding to the first pixel electrode forms a first brightness area.

The second pixel electrode is insulated from and partially overlaps the storage capacitor electrode of the LCD panel, so as to obtain the second data voltage by a coupling effect of the capacitors. Thus, the first brightness area can be provided by the area corresponding to the first pixel electrode, and the second brightness area can be provided by the area corresponding to the second pixel electrode. Therefore, while the LCD panel carries out the operations of image display, the first and the second brightness areas are employed in a pixel for achieving low color shift and enhancing the quality of the LCD panel.

As such, an LCD display, which includes the previously discussed LCD panel and a backlight module, is provided in an embodiment. The backlight module provides backlight to the LCD panel for image display.

Hereinafter, a drawing is employed for illustrating a pixel structure of the LCD panel according to an embodiment of the disclosure. However, the embodiment mentioned hereinafter is just one embodiment among a number of embodiments, and the drawing illustrating the pixel structure (including transistors and layout patterns of transparent electrode) are employed for demonstrating an implementation to persons with ordinary skill in the art, rather than limiting the scope sought by the disclosure. Furthermore, some aspects and/or features may be omitted in the drawings for simplicity.

Referring to FIG. 1, an illustration of the pixel structure of a liquid crystal display panel according to a nonlimiting embodiment is shown. As shown in FIG. 1, a pixel structure 105 is defined by a data line 101 and a scan line 102, and the pixel structure 105 includes a transistor 110 and a pixel electrode 120. The transistor 110 includes a gate 111 (realized by the same metal layer as the scan line 102), a semiconductor layer 112, a source 113, and a drain 114 (the source 113 and the drain 114 are realized by the same metal layer as the data line 101). The pixel electrode 120 includes a first pixel electrode 121 and a second pixel electrode 122, which are insulated from each other.

In an example, the first pixel electrode 121 is electrically connected to the drain 114 of the transistor 110 through a via hole VH1, so as to receive first data voltage. In here, the first pixel electrode 121 further connects to a storage capacitor electrode SCE positioned on a common electrode line CL through a via hole VH2, so that the storage capacitor electrode storage capacitor electrode processes an identical voltage level. Thus, the storage capacitor necessary for displaying can be obtained with the storage capacitor electrode SCE and the common electrode line CL. The second pixel electrode 122 and the storage capacitor electrode SCE are partially overlapped with each other, and the second pixel electrode 122 accordingly obtains second data voltage by a coupling effect of the capacitors. The common electrode line CL is further illustrated in FIG. 1. The second pixel electrode 122 is insulated from the drain 114 and obtains the second data voltage by coupling effect.

The first pixel electrode 121 and the second pixel electrode 122 respectively include a first pattern p1 and a second pattern p2 different from each other. The first pattern p1 is a v-shaped pattern, or a chevron pattern, and the second pattern is a complementary of the first pattern p1.

Regarding to the pattern structure, the first pattern p1 includes a first part r1 and a second part r2, and the second pattern p2 includes third part r3, fourth part r4, and fifth part r5. The third, the fourth, and the fifth parts r3, r4, and r5 are connected one another and surround the first and the second parts r1 and r2. The first part r1 is substantially positioned between the third and the fourth parts r3 and r4, and the second part r2 is substantially positioned between the fourth and the fifth parts r4 and r5. Thus, when operations of image display are carried out, two areas with a first brightness area can be formed with the first and the second parts r1 and r2, and three areas with a second brightness area can be formed with the third, the fourth, and the fifth parts r3, r4, and r5.

Since the entire pixel structure 105 is segmented into parts, which are arranged alternatively, no unwanted visual effect, such as one pixel has multiple sub-pixels with different brightness, is observable by the human eye. The area of the first pattern p1 and the area of the second pattern p2 may have a ratio between 1:1 to 1:2.

In the present embodiment, the first pixel electrode 121 and the second pixel electrode 122 has at least a trunk t and numerous of branches b, wherein the branches b are connected to the trunk t. Additionally, the liquid crystal layer of the LCD panel according to the present embodiment includes numerous LC molecules and numerous polymers and the polymers are formed on the surface of the substrates after the polymerization driven by ultraviolet. With the characteristic of the polymers, LC molecules can be set with pretilt angle, so as to achieve multi-domain vertical alignment of the LC molecules with no extra elements for tilt control (such as protrusions and slits) of the LC molecules.

Conventionally, elements for tilt control of the LC molecules are needed on the upper substrate of LCD employing vertical alignment (VA) techniques. Since the elements for tilt control usually would not be displayed, the trunk of an indium tin oxide (ITO) electrode (on which no fringing electric field is used for controlling the tilt of the LC molecules) and the elements for tilt control on the upper substrate are placed on corresponding position. Thus, the width of trunks of conventional LCD cannot be effectively shrunk. Further, the conventional LCD employing VA techniques controls the LC molecules with an electric field established by the branches of the pixel electrode. The capability for LC molecule control, however, is reduced as the length of branches increases.

Based on the description above, in comparison to the conventional LCD display, the present embodiment can omit the tilt control elements positioned on the upper substrate, reduces the width of the trunk of ITO electrode, and enlarges the aperture area of LCD.

In addition, the LCD according to the present embodiment further employs PSMVA techniques for making LC molecules have a pretilt angle with polymers, so that the LCD can further enhance the capability of the slit of ITO for controlling LC molecules, so that it is possible to extend the length of the slits without degrading the display performance. Therefore, the LCD according to the present embodiment can further enlarge the aperture area of LCD.

Figure 2:
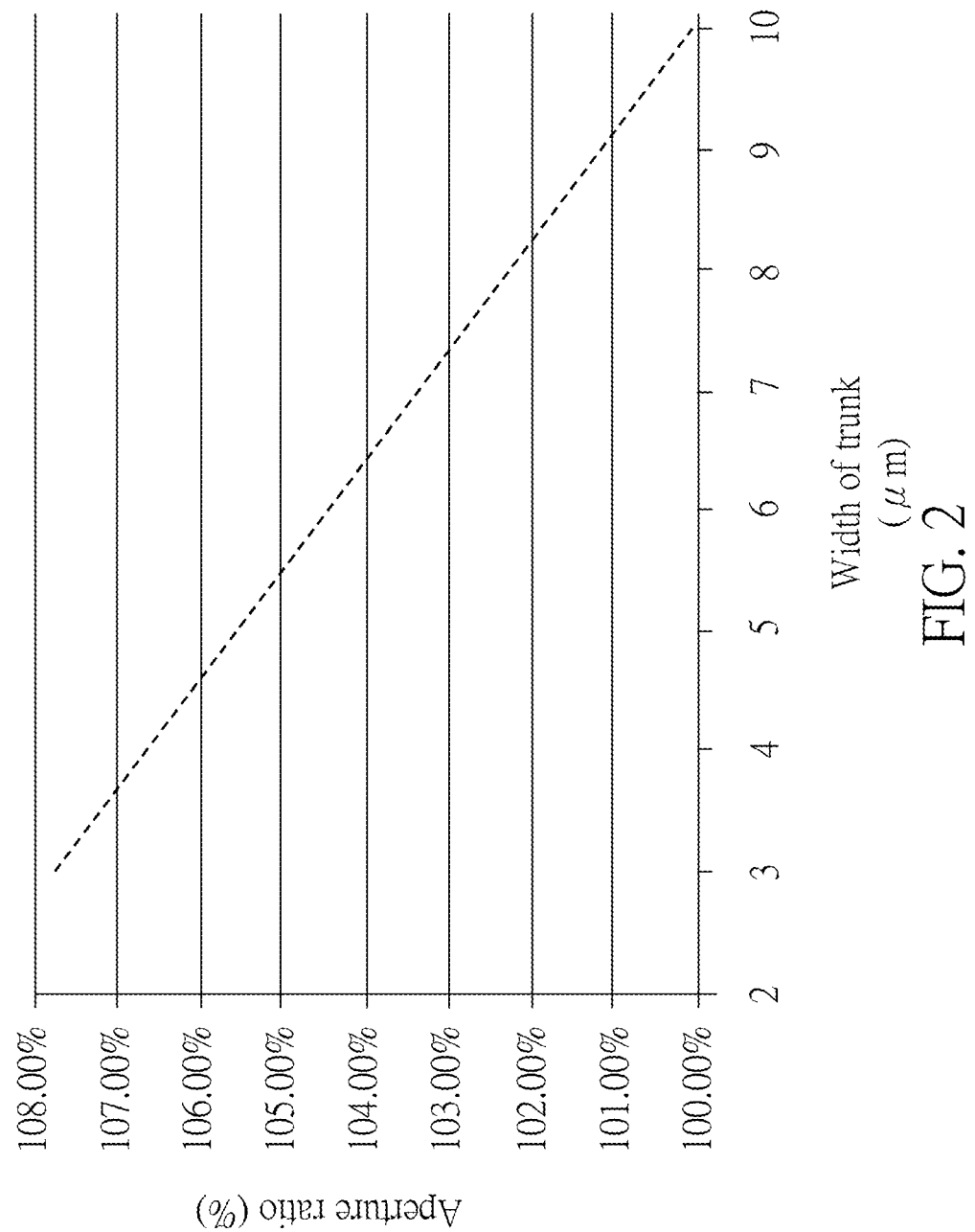
FIG. 2 is a simulation result of the aperture ratio of LCD panel to the width of the trunk.

In the present embodiment, the width D of the trunk t can be smaller than or equal to 10 μm and preferably between 3 μm and 10 μm with reference to FIG. 2, wherein a simulation result of the aperture ratio of LCD panel to the width of the trunk is shown.

Figure 3:
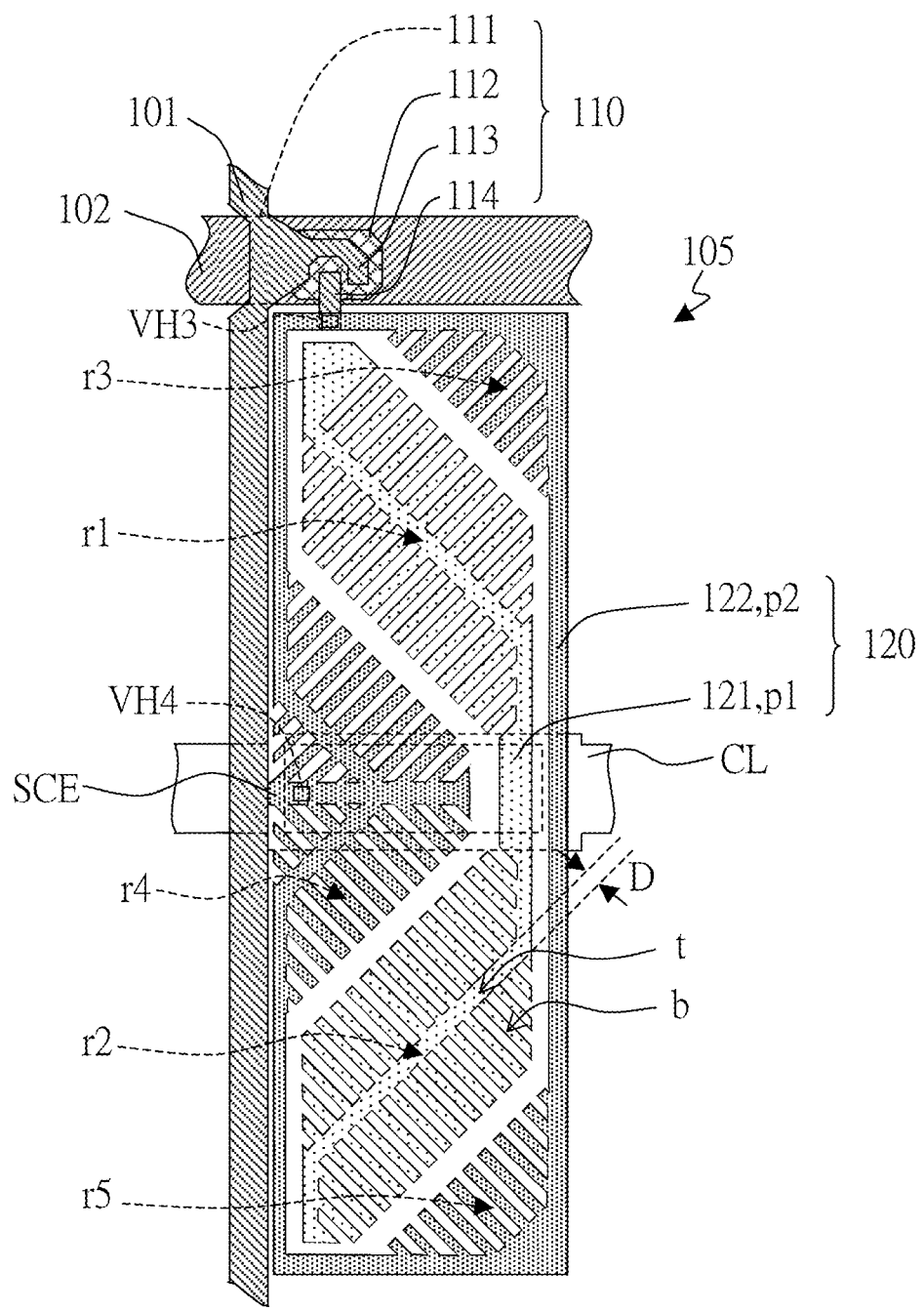
FIG. 3 is another illustration of a nonlimiting embodiment of the pixel structure of a liquid crystal display panel.

Although only the situation where the first and the second pixel electrodes 121 and 122 respectively include the patterns shown in FIG. 1 is illustrated, the first and the second pixel electrodes 121 and 122, however, are not limited thereto. In other examples, the drain 114 can also be electrically connected to the second pattern p2 shown in FIG. 3, so that the first pattern p1 (i.e. the v-shaped pattern) are the electrode with coupling effect and the second pattern p2 are the electrode with direct electrical connection. For example, the pixel structure of the LCD panel can be shown as FIG. 3, wherein the drain 114 is connected to the second pixel electrode 122 having the second pattern p2 through a via hole VH3, and the second pixel electrode 122 having the second pattern p2 is further connected to the storage capacitor electrode SCE on the common electrode line CL through a via hole VH4.

In addition, although only the situation that the trunk t and branches b are connected with an angle of 90 degree has been illustrated in FIG. 1, the present embodiment is not limited thereto. In other examples, the trunk t and the branches b are connected at an angle of 45 degree or other degrees.

The LCD panel and LCD using thereof according to the present embodiment employs an LCD panel with PSMVA techniques of wide-viewing angle and further can omit the manufacture process of MVA patterning on transparent common electrode. Further, at least two electrodes are included in the pixel electrode of each of the pixels within the LCD panel for providing at least two areas with different brightness while image display operations are carried out, so as to mix at least two different brightness within one pixel, calibrate color shift effect, and enhance the pixel quality of the LCD display.

It is to be understood that the present application is not limited to the described. On the contrary, the application is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
a lower substrate, comprising:
a plurality pixel structures, each of which comprising:
a transistor; and
a pixel electrode, comprising a first pixel electrode and a second pixel electrode insulated from each other, the first and the second pixel electrodes respectively including a first pattern and a second pattern, the first pattern and the second pattern, corresponding to each of the pixel structures, being complementary to each other, each of the first pixel electrode and the second pixel electrode having at least a trunk and a plurality of branches, the branches being connected to the trunk, and the trunk having a width smaller than or equal to 10 microns (um);
an upper substrate, positioned in parallel and on top of the lower substrate; and
a liquid crystal (LC) layer, positioned between the upper and the lower substrates, the LC layer comprising a plurality of LC molecules and a plurality of polymers, the polymers being formed on surfaces of at least one of the upper and the lower substrates to cause the plurality of LC molecules to have a pretilt angle;
wherein the first pattern comprises a first part and a second part, the second pattern comprises a third part, a fourth part, and a fifth part, the first part being substantially between the third and the fourth parts, the second part being substantially between fourth and the fifth parts, and the first and the second parts being surrounded by the third, the fourth, and the fifth parts.

2. The LCD panel according to claim 1, wherein the first pixel electrode is electrically connected to a drain of the transistor for receiving a first data voltage, and the first data voltage is further coupled to the second pixel electrode to cause the second pixel electrode has a second data voltage.

3. The LCD panel according to claim 1, wherein the second pixel electrode partially overlaps a metal wire.

4. The LCD panel according to claim 1, wherein the second pixel electrode is insulated from and partially overlaps an electrode of a storage capacitor.

5. The LCD panel according to claim 1, wherein one of the first and the second patterns is a V-shaped pattern.

6. The LCD panel according to claim 1, wherein the width is between 3 um to 10 um.

7. The LCD panel according to claim 1, wherein an angle between the trunk and one of the branches is about 45 degrees.

8. The LCD panel according to claim 1, wherein an angle between the trunk and one of the branches is about 90 degrees.

9. The LCD panel according to claim 1, wherein the first pattern and the second pattern have a ratio of area between 1:1 and 1:2.

10. A liquid crystal display (LCD), comprising:
an LCD panel, comprising:
a lower substrate, comprising:
a plurality pixel structures, each of which comprising:
a transistor; and
a pixel electrode, comprising a first pixel electrode and a second pixel electrode insulated from each other, the first and the second pixel electrodes respectively including a first pattern and a second pattern, the first pattern and the second pattern, corresponding to each of the pixel structures, being complementary to each other, each of the first pixel electrode and the second pixel electrode having at least a trunk and a plurality of branches, the branches being connected to the trunk, and the trunk having a width smaller than or equal to 10 microns (um);
an upper substrate, positioned in parallel and on top of the lower substrate; and
a liquid crystal (LC) layer, positioned between the upper and the lower substrates, the LC layer comprising a plurality of LC molecules and a plurality of polymers, the polymers being formed on surfaces of at least one of the upper and the lower substrates to cause the plurality of LC molecules to have a pretilt angle; and
a backlight module, for providing backlight to the LCD panel, so as to achieve image display;
wherein the first pattern comprises a first part and a second part, the second pattern comprises a third part, a fourth part, and a fifth part, the first part is substantially between the third and the fourth parts, the second part is substantially between fourth and the fifth parts, and the first and the second parts are surrounded by the third, the fourth, and the fifth parts.

11. The LCD according to claim 10, wherein the first pixel electrode is electrically connected to a drain of the transistor for receiving a first data voltage, and the first data voltage is further coupled to the second pixel electrode to cause the second pixel electrode have a second data voltage.

12. The LCD according to claim 10, wherein the second pixel electrode partially overlaps a metal wire.

13. The LCD according to claim 10, wherein the second pixel electrode is insulated from and partially overlapped with an electrode of a storage capacitor.

14. The LCD according to claim 10, wherein one of the first and the second patterns is a V-shaped pattern.

15. The LCD according to claim 10, wherein the width is between 3 um to 10 um.

16. The LCD according to claim 10, wherein an angle between the trunk and one of the branches is about 45 degrees.

17. The LCD according to claim 10, wherein an angle between the trunk and one of the branches is about 90 degrees.

18. The LCD according to claim 10, wherein the first pattern and the second pattern have a ratio of area between 1:1 and 1:2.

\* \* \* \* \*